United States Patent

[11] 3,613,888

| | | | | |
|---|---|---|---|---|
| [72] | Inventor | W. Leslie Harris | | |
| | | Concord, Calif. | | |
| [21] | Appl. No. | 27,625 | | |
| [22] | Filed | Apr. 13, 1970 | | |
| [45] | Patented | Oct. 19, 1971 | | |
| [73] | Assignee | Contra Costa County Water District | | |
| | | Concord, Calif. | | |

[54] FILTER-BACKWASHING METHOD
6 Claims, 2 Drawing Figs.

[52] U.S. Cl. .................................................. 210/80,
210/82, 210/274, 210/275, 210/290
[51] Int. Cl. .................................................... B01d 23/24
[50] Field of Search .......................................... 210/80, 82, 274, 275

[56] References Cited
UNITED STATES PATENTS

| 3,506,125 | 4/1970 | Willis et al. ..................... | 210/80 X |
| 3,459,302 | 8/1969 | Ross .............................. | 210/274 X |

Primary Examiner—Samih N. Zaharna
Attorney—Townsend and Townsend

ABSTRACT: A waterplant granular filter bed is backwashed by flowing backwash water through the bed to dislodge particulate filtrate matter and suspend it in the backwash water. The water flow rate is relatively slow and by itself insufficient to raise all particulate matter as the backwash water rises above the filter bed towards a backwash water trough. Sufficient air is injected into the rising backwash water flow just above the top surface of the filter bed to at least about double the backwash water rising speed whereby substantially all particulate filtrate matter is readily discharged into the backwash water troughs.

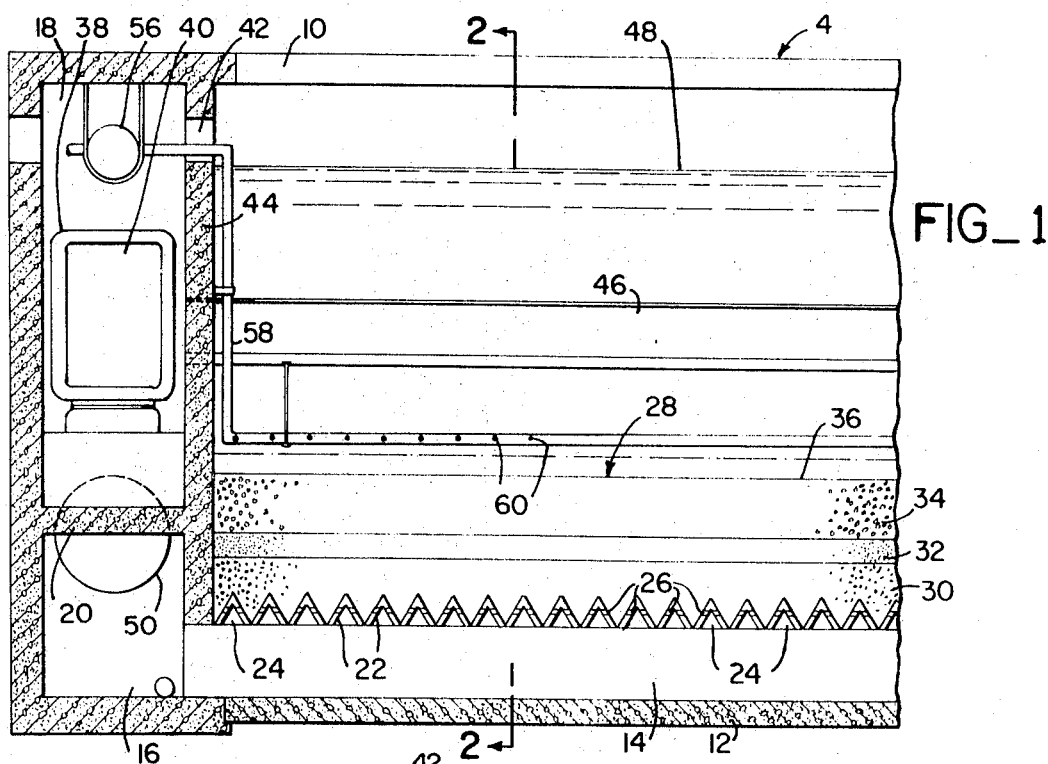
FIG_1
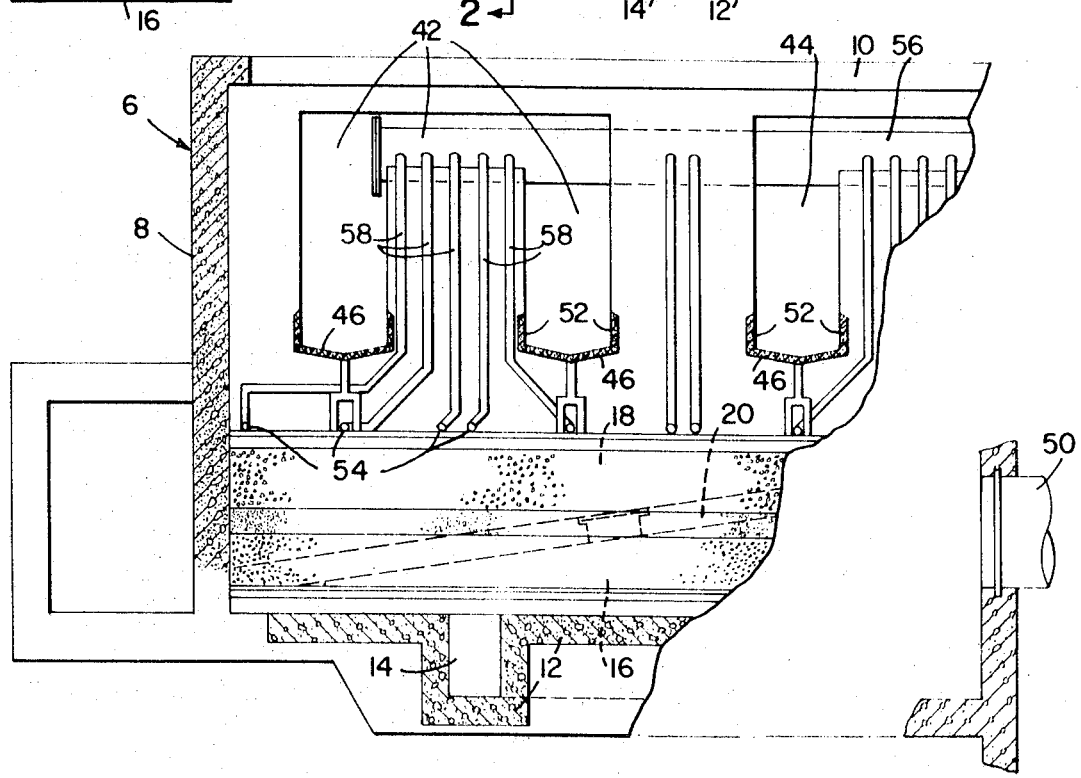
FIG_2
INVENTOR.
W. LESLIE HARRIS
BY
Townsend and Townsend
ATTORNEYS

FILTER-BACKWASHING METHOD

BACKGROUND OF THE INVENTION

Waterplants presently extensively employ granular water filters comprising layers of gravel, sand and anthracite. A body of water contained within the filter structure is maintained above the filter bed and filters through the granular filter bed material to result in a clear and potable effluent that is collected below the filter and flowed to a storage tank or water pipe system. Impurities in the water are retained in the filter bed.

From time to time it is necessary to cleanse the filter bed of the particulate contaminants therein to assure the desired filtration rate and prevent an eventual plugging of the filter. The cleansing is customarily done by backwashing the filter, that is by introducing a flow of wash water through the filter that moves opposite to the normal water filtration flow. The backwash water dislodges the materials removed from the raw water, hereinafter also referred to as impurities, that have collected in the filter to form a suspension which rises some distance above the top surface of the filter bed before being discharged into backwash water collection troughs.

A minimum wash water rising speed above the filter bed is usually necessary to maintain the dislodged impurities in suspension. Such speed, however, causes undesirable disturbances in the filter bed, causes an intermixing of the sand and upper gravel layers and requires the relative frequent and expensive replacement of the filter beds. In addition, substantial quantities of backwash water to clean large-size waterplant filters are necessary. This further increases the costliness of the backwash operation. Lastly, the deteriorating filter quality requires backwash cycles of increasing frequency so that useable filtration time of the filter becomes shorter and shorter as the filter bed approaches the end of its service life.

Slower backwash water flows through the filter bed result in slow wash water rising speeds above the filter which are unable to keep all dislodged impurities in suspension and/or rise them sufficiently high for discharge into the wash water troughs. As a result, a cake collects on top of the filter bed which must be separately removed. Such removal is usually inefficient, causes the formation of so-called "mud balls" and frequently employs mechanical means which disturb and damage the filter bed. These shortcomings substantially lower the filter's efficiency and increase its cost of operation.

SUMMARY OF THE INVENTION

The present invention provides a method for backwashing granular filters at relatively low water flow rates to prevent damage to the filter bed while assuring a water flow rate above the filter bed into the backwash water collection trough which is sufficiently high to assure that substantially all dislodged particulate matter is carried with the backwash water flow and discharged into the wash water collection trough. Briefly, the method of the present invention comprises the steps of flowing a wash liquid opposite to the liquid filtration direction through the filter medium to dislodge materials that have been removed from the raw water from the medium and suspend the materials in the wash liquid and form a suspension. The suspension is then flowed in an upward direction above the top surface of the filter medium. The suspension flow rate above the filter medium is increased by injecting a volume of a gas into the suspension adjacent the uppermost filter bed surface whereby the suspension is accelerated in its upward movement and a substantially complete removal of all impurities from the filter without damage to the filter medium from high wash liquid flow-through rates is obtained.

This filter is ideally suited for large-scale waterplant filtration. Best results have been obtained by injecting a sufficient air volume into the suspension rising above the filter bed to substantially double the effective water flow rate above the filter. All particulate matter in the suspension is thereby readily carried with the suspension and discharged into the wash water collection troughs without resettling on top of the filter bed.

Thus, the present invention enables the backwashing of large granular waterplant filters by flowing the wash water through the filter medium at a speed which assures the dislodging of all filtered particles while preventing damage to the filter material. This substantially prolongs the useful service life of granular filters, substantially reduces the water consumption per backwash cycle and thus results in an appreciable lowering of the costs of operating water plants. Additionally, the optimal wash water flow rate through the filter bed enables a minimization of the backwash cycle time to enable maximum use of the filter for water production purposes.

The apparatus for carrying out the invention provides the positioning of air discharge conduits closely adjacent the top surface of the filter bed to obtain high suspension flow rates throughout substantially the full distance between the filter bed and the wash water collection trough. As compared to the normal position of the filter bed top surface the air discharge conduits are, however, spaced a sufficient distance so that filter bed expansion during the backwash cycle can be accommodated without contact between the discharge conduits and the filter bed.

The apparatus employs readily available and low-cost components to assure low installation costs for the backwash system of the present invention.

By injecting a gas such as air into the rising wash water flow above the filter bed two additional major advantages are achieved. First, as contrasted to injecting additional water into the flow, which would require huge additional water quantities as well as large diameter piping and expensive controls, the air injection system of the present invention is substantially more economical. Secondly, as compared to the air injection below the filter bed, which subjects the filter bed to uncontrolled random movements of fluids having differing specific gravities, disturbs the filter material and thus damages the filter and requires its relatively frequent replacement, the air injection system above the filter permits the continuous, uniform and gentle washing of the filter. Maximum filter life is thereby achieved.

BRIEF DESCRIPTION OF THE DRAWINGS

FIG. 1 is a fragmentary side elevational view of a granular water plant filter illustrating the air injection system; and FIG. 2 is a fragmentary front elevational view of the water plant filter illustrated in FIG. 1 and is taken on lines 2—2 of FIG. 1.

DESCRIPTION OF THE PREFERRED EMBODIMENTS

Referring to the drawings, a large-scale granular waterplant filter 4 of the type here illustrated may, for example, filter up to 20 million gallons per day (m.g.d.) and more and may have a substantially rectangular plan configuration with two filter halves having cross dimensions of about 18×40 feet. The filter comprises a filter support structure 6 defined by upright sidewalls 8, a large, rectangular opening 10 on its top and a base 12 which defines a plurality of spaced apart cross channels 14 extending across the width of the filter and terminating in a lower gullet or collection trough 16 extending over the length of the filter. The filter structure also includes an upper gullet 18 which is separated from the lower gullet by a sloping wall 20. The lower gullet serves for the collection of filtered water, or the introduction of backwash water into the filter, while the upper gullet serves for the introduction of water to be filtered during normal filtering operations or, during the backwash cycle, for the removal of backwash water as more fully described hereinafter.

Base 12 of the filter structure supports a plurality of generally triangularly shaped underdrains 22 which define inverted channels 24 running over the length of the filter and communicating with the upper side of the under drains via drainage openings 26. The under drains are suitably grouted together to define a rigid structure. Underdrain channels 24 serve for the removal of filter effluent by guiding it to one of cross channels 14.

A filter bed 28 is disposed on top of underdrains 22. Preferably the filter bed comprises a conventional granular filter medium such as a lowermost gravel layer 30, an intermediate sand layer 32 and an anthracite layer 34 forming the uppermost portion of the filter bed and a top surface 36 thereof. The gravel, sand and anthracite layers may have thicknesses of 18, 10 and 20 inches, respectively, for example for conventional large scale household water production purposes.

A filter water supply line 38 leads into upper gullet 18 and can be closed with a butterfly valve 40 mounted at the end of the supply line. For water filtration the butterfly valve is opened to introduce filter water into the upper gullet which flows through U-shaped openings 42 in filter bed end wall 44 into a plurality of spaced-apart wash water troughs 46. After the wash water troughs become filled filter water spills over onto filter bed 28 and, as the water flows through the thickness of the filter bed, particulate impurities are removed therefrom to provide a clear effluent which is collected in underdrain channels 24, cross channels 14 and which is discharged from the filter via lower gullet 16 to a suitable storage tank (not shown). During water production the water level 48 in the filter is permitted to rise substantially above wash water troughs 46 to provide the necessary water head for high filtration rates and water production.

After prolonged use of the filter impurities in the filter bed begin to clog the filter and thus slow down water production. The filter is cleaned by backwashing it, that is by closing butterfly valve 40 and suitably shutting off lower gullet 16 from the filtered water storage tank (not shown). Instead a valve (not separately shown) in a backwash water supply pipe 50 is opened to introduce backwash water into the lower gullet which rises through filter bed 28 via cross channels 12 and underdrain channels 24. The backwash water dislodges particulate impurities entrapped in the filter bed to form a wash water-particulate impurities suspension which rises above the filter bed to the upper end of sidewalls 50 of wash water troughs 46. From there the suspension enters and is collected in the wash water troughs and flows into the upper gullet 18 where it is collected and discharged via a suitable valve and conduit (not separately shown) to the raw water supply or a settling tank for removal of the particulate impurities from the suspension.

As already referred to in the introductory portions to the specification at least some of the particles in suspension have a tendency to settle on top surface 36 of the filter bed if the wash water or suspension rise rate above the filter bed is too low. An increase of that rate, however, requires increased wash water speeds through the filter bed which disturbs and damages the bed and requires its relatively frequent and costly replacement.

To increase the effective suspension rise rate above the filter bed without damaging the bed the present invention provides a plurality of air discharge conduits or pipes 54 which are positioned above top surface 36, run at right angles to underdrain channels 24, and which are spaced apart as illustrated in FIG. 2. A central pressurized air supply manifold 56 communicating with a conventional air blower (not separately shown) is supported by filter structure 6, and is disposed in and extends over substantially the full length of upper gullet 18. Each air discharge pipe 54 is connected with the air supply manifold by an air feeder line 58 connected to one end of the discharge pipe and extending upwardly along filter end wall 44 and through one of openings 42 in the filter end wall for connection to the supply manifold.

During the backwash operation pressurized air is injected into the rising wash water suspension from a plurality of small discharge openings 60 spaced over the lengths of air discharge pipes 54. The volume of water and air that rises from closely adjacent filter bed top surface 36 to the top of wash water trough side walls 52 is thereby increased so that the effective speed is correspondingly increased and dislodged particles are prevented from settling on top of the filter bed. The heretofore necessary scouring of the filter bed top to remove filtrate cakes because particles settled from the suspension, which was time consuming, required expensive equipment and could damage the filter bed, is thereby eliminated.

In a typical installation of the air injection system of the present invention to facilitate the backwashing of granular waterplant filters, in which the filter bed is divided in two halves each having surface dimensions of about 18×40 feet and is constructed for a daily water production of about 20 m.g.d. the filter has a normal thickness of about 48 inches and is backwashed at a rate of 2 cubic feet of water per minute per square foot of filter top surface area. No disturbances in the filter materials are experienced while substantially all particulate impurities entrapped in the filter bed are removed therefrom. However, during the backwash step the filter bed expands upwardly approximately one-eighth of its total height, or about 6 inches. Air discharge pipes 54 are, therefore, spaced 8 to 10 inches above the filter bed top surface 36, when using 3-inch diameter discharge pipes, to prevent interferences between the expanded filter bed top surface and the pipes. Moreover, the air blower is constructed so that is supplies pressurized air at 3 to 5 p.s.i. above atmospheric pressure whereby the discharged air volume at least equals but, preferably, slightly exceeds the wash water volume passing the filter bed. Thus, the air supply is so constructed that it injects at least about 2 cubic feet of air per minute per square foot of filter bed top surface area.

Without air injection the wash water suspension rise rate above the filter is about 24 inches. With air injection it is at least doubled or, preferably, more than doubled to achieve an effective water rise rate above the filter bed of between about two and three times the wash water rise rate without air injection. Substantially all particles dislodged from the filter bed are thereby carried upwardly and discharged into the wash water troughs 46 for complete removal from the filter. When the wash water discharged into wash water troughs 46 is substantially clear, that is substantially free of particulate impurities, the wash water supply into lower gullet 16 is turned off and water filtration and production is commenced in the above-described manner.

I claim:

1. A method for cleansing the filter medium in a flow-through filter for liquids comprising the steps of flowing a wash liquid opposite to the liquid filtration direction through the filter medium to dislodge impurities from the medium, suspending the impurities in the wash liquid and forming a suspension, flowing the suspension in an upward direction, and increasing the flow rate of the suspension after the suspension leaves the filter medium by injecting a volume at least about equal to the volume of wash liquid passing through the filter of an undissolved gas only into the suspension adjacent an upper surface of the filter medium, whereby the suspension is accelerated in its upward movement and a substantially complete removal of all impurities from the filter without damage to the filter medium from high wash liquid flow-through rates is obtained.

2. A method of backwashing waterplant filters having filter beds of a granular material disposed at a lower end of a filter structure comprising the steps of: flowing backwash water in a direction reverse to the filtration direction through the filter medium, flowing the backwash water upwardly a distance above the filter bed, discharging the water from the filter structure at a point above the filter bed, and substantially at least doubling the speed of the upwardly flowing backwash water above the filter by injecting an undissolved gaseous medium into the backwash water flow at a point closely adjacent and above the filter bed to facilitate the removal of backwashed particulate impurities from the filter structure without damaging the filter bed.

3. A method according to claim 2 wherein the step of injecting the gaseous medium comprises the steps of providing a discharge conduit above the filter bed, passing compressed air in its gaseous state through the conduit, and ejecting air from the conduit over the filter bed at an expanded volumetric rate which is at least about equal to the rate with which the backwash water volume passes the filter bed.

4. A method of backwashing large-scale waterplant filters having a granular filter bed at relatively low backwash water speeds through the bed while assuring substantially complete removal of the raw water impurities from the bed, the method comprising the steps of flowing backwash water through the filter bed at a predetermined volumetric rate to remove impurities from the bed and suspend the impurities in the backwash water, said predetermined rate being insufficient to raise substantially all suspended impurities with the backwash water and discharge such impurities from a top surface of a supporting filter structure, and injecting compressed air in its gaseous state into the backwash water flow at a point above a top surface of the filter bed and at a volumetric rate at least about equal to said predetermined volumetric rate to thereby at least about double the effective speed of the backwash water flow above the filter bed, carry substantially all dislodged impurities with the backwash water flow and discharge such impurities over the top surface of the supporting structure for a substantially complete cleansing of the filter bed, including the filter bed top surface, in a relatively short time and without subjecting the filter bed to high backwash water flows.

5. A method according to claim 4, wherein the filter bed comprises a sand-anthracite sand filter, wherein the step of flowing the backwash water through the filter comprises the step of flowing the backwash water at a rate of about 2 cubic feet per square foot of filter bed surface per minute through the filter bed, and wherein the step of injecting the air comprises the step of injecting into the backwash water flow above the filter bed sufficient compressed air so that it expands to a volume of at least about 2 cubic feet of pressurized air per square foot filter bed surface per minute.

6. A method according to claim 5 wherein the step of injecting pressurized air comprises the steps of pressurizing the air to between about 2 to about 5 pounds per square inch before discharging the air into the backwash water flow above the filter bed.